United States Patent
Kuznar

(12) 
(10) Patent No.: US 7,313,963 B2
(45) Date of Patent: Jan. 1, 2008

(54) ISOTHERMAL DE-ICED SENSOR

(75) Inventor: Ronald Joseph Kuznar, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/363,772

(22) Filed: Feb. 28, 2006

(65) Prior Publication Data

US 2007/0199384 A1    Aug. 30, 2007

(51) Int. Cl.
*G01L 7/00* (2006.01)
(52) U.S. Cl. .................... 73/700; 73/715; 244/121
(58) Field of Classification Search .......... 73/715; 244/121
See application file for complete search history.

(56) References Cited

U.S. PATENT DOCUMENTS

| | | | | |
|---|---|---|---|---|
| 4,058,160 A | | 11/1977 | Cormal et al. | |
| 4,075,964 A | * | 2/1978 | Sjogren | 114/40 |
| 4,117,794 A | * | 10/1978 | Sjogren | 114/40 |
| 4,275,603 A | * | 6/1981 | Kalocsay | 73/861.68 |
| 5,752,674 A | * | 5/1998 | Mears et al. | 244/134 R |
| 6,250,801 B1 | * | 6/2001 | Bernard | 374/138 |
| 6,425,241 B1 | | 7/2002 | Jones et al. | |
| 6,435,454 B1 | * | 8/2002 | Engelhardt | 244/117 A |

FOREIGN PATENT DOCUMENTS

| | | |
|---|---|---|
| GB | 1515499 A | 6/1978 |
| GB | 1573235 A | 8/1980 |
| GB | 2155999 A | 10/1985 |

OTHER PUBLICATIONS

GB Search Report; Dated May 24, 2007; Reference No. 13DV-163837/12223; Application No. GB0703760.9; 3 pgs.

* cited by examiner

*Primary Examiner*—Andre J. Allen
*Assistant Examiner*—Jermaine Jenkins
(74) *Attorney, Agent, or Firm*—William Scott Andes; Armstrong Teasdale LLP

(57) ABSTRACT

Temperature and pressure sensors are protected from ice buildup by a in heat exchange relationship with a probe surrounding the sensors.

8 Claims, 5 Drawing Sheets

US 7,313,963 B2

ISOTHERMAL DE-ICED SENSOR

BACKGROUND OF THE INVENTION

The present invention relates generally to gas turbine engines, and, more particularly, to temperature and pressure sensors for measuring compressor inlet temperature and pressure.

In certain aircraft and aero-derivative gas turbine engines sensors are used to measure air temperature and pressure at the inlet to the compressor. Accurate measurements of the inlet temperature and pressure are critical, because the measurements are used for establishing control of the variable geometry of the stators in the compressor. In some operating conditions of aircraft engines, ice may accumulate on the inlet temperature and pressure sensor. Ice accretion interferes with the accuracy of the temperature and pressure readings provided by the sensors, and release of accumulated masses of ice into the compressor may cause damage to compressor blades.

A heat pipe is a known heat transfer device utilizing an evaporation and condensation cycle for transferring heat from a hot or heat input region to a cold or heat output region of the device with minimum temperature drop. One type of heat pipe comprises a closed, pressurized container within which is a layer of wicking material extending from the heat input region to the heat output region and saturated with a compatible vaporizable liquid. The volume interior to the closed, pressurized container is pressurized to a fixed pressure that sets the saturation temperature of the liquid. Selection of the vaporizable liquid is based upon its known vaporization and condensation characteristics at its saturation pressure and temperature, particularly its vaporization and condensation characteristics at the pressure selected for the closed, pressurized container. The temperature typical of the environment within which it is to be used are taken into account is selecting the container, liquid and wicking material. Heat applied to the heat input region of the closed, pressurized container vaporizes the liquid. The resulting vapor moves to the heat output region of the container, where the liquid transfers heat to the wall of the container and condenses to its liquid state. The condensed liquid is returned to the heat input region by capillary action in the wicking material. The heating and condensation cycle is repeated continuously to maintain a nearly constant temperature within the heat pipe and a consistent temperature relationship between the heat input region and heat output region.

BRIEF DESCRIPTION OF THE INVENTION

A probe containing temperature and pressure sensors is protected from ice buildup by a heat pipe in heat exchange relationship with the probe.

DETAILED DESCRIPTION OF THE INVENTION

Figure 1:
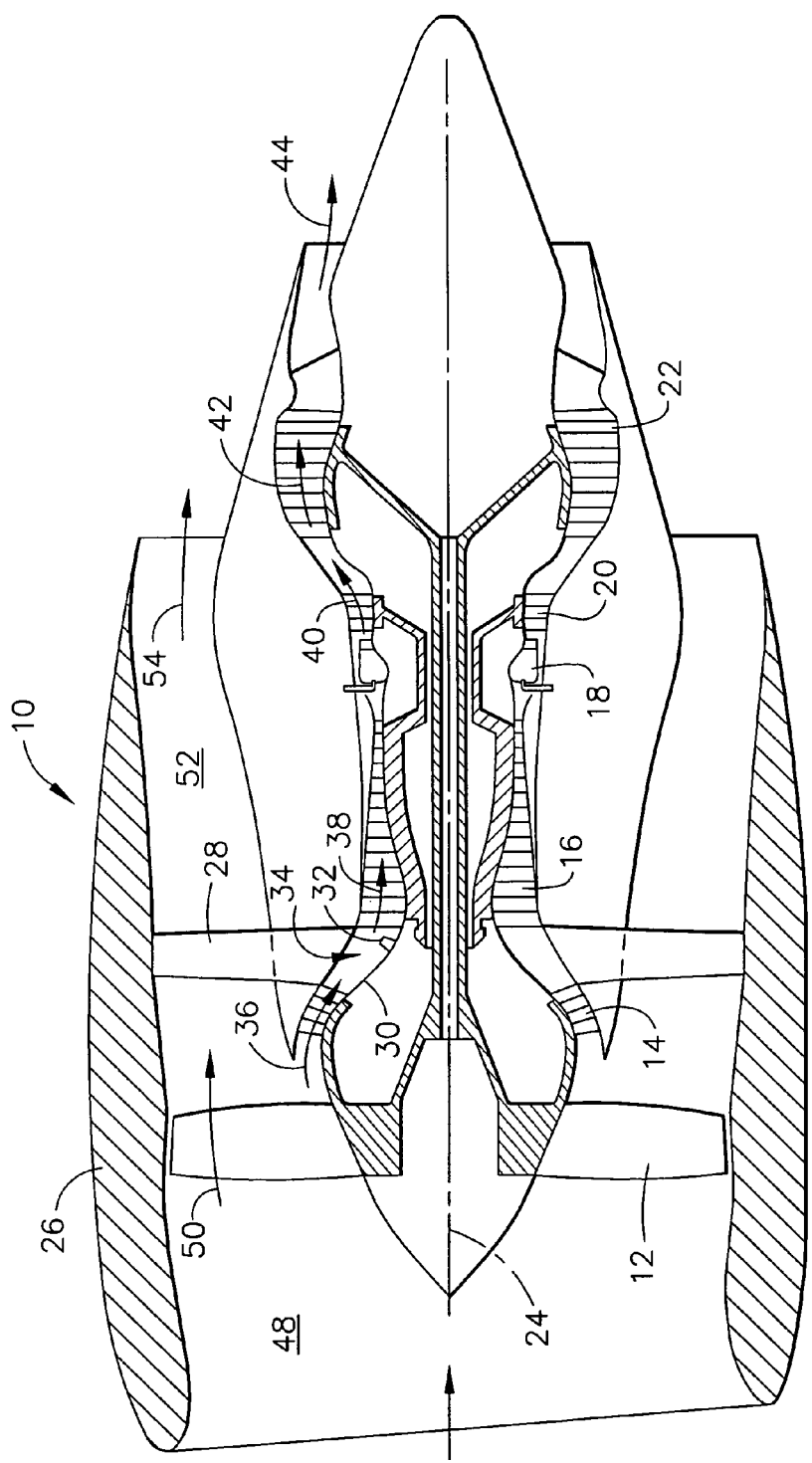
FIG. 1 is a schematic cross-sectional view of a gas turbine engine having an isothermal sensor.

FIG. 1 is a schematic cross-sectional elevation view of a gas turbine engine 10, comprising a fan 12, booster 14, compressor 16, combustor 18, high pressure turbine 20 and low pressure turbine 22 in axial flow communication about a longitudinal axis 24. Fan casing 26 is supported by a plurality of struts 28 which extend radially from stator component 30. A probe 32 is disposed axially forward of the compressor inlet 34 projecting radially from said stator component 30 into the compressor inlet flow path shown by arrow 36. Probe 32 houses sensors for measuring pressure and temperature of air entering the engine core flow path represented by arrows 36, 38, 40. 42 and 44. During engine operation, as shown by arrow 46, air is drawn into fan inlet 48 by fan 12 and splits into fan flow 50 exiting fan bypass duct 52, as shown by arrow 54, and engine core flow traveling along the engine core path, including booster flow, shown by arrow 36, compressor flow, shown by arrow 38, high pressure turbine flow, shown by arrow 40, low pressure turbine flow, shown by arrow 42 and engine exhaust flow, shown by arrow 44. When an aircraft powered by engine 10 is operating at certain conditions such as descending at low engine rotational speed, the air temperature and humidity tend to cause ice accumulation on the probe 32 which would interfere with the accuracy of the temperature and pressure readings provided by the sensors within probe 32. Preventing ice accumulation on the probe improves accuracy of sensor readings and avoids damage to compressor blades by ice chunks which may separate from the probe and be drawn into the compressor.

Figure 2:
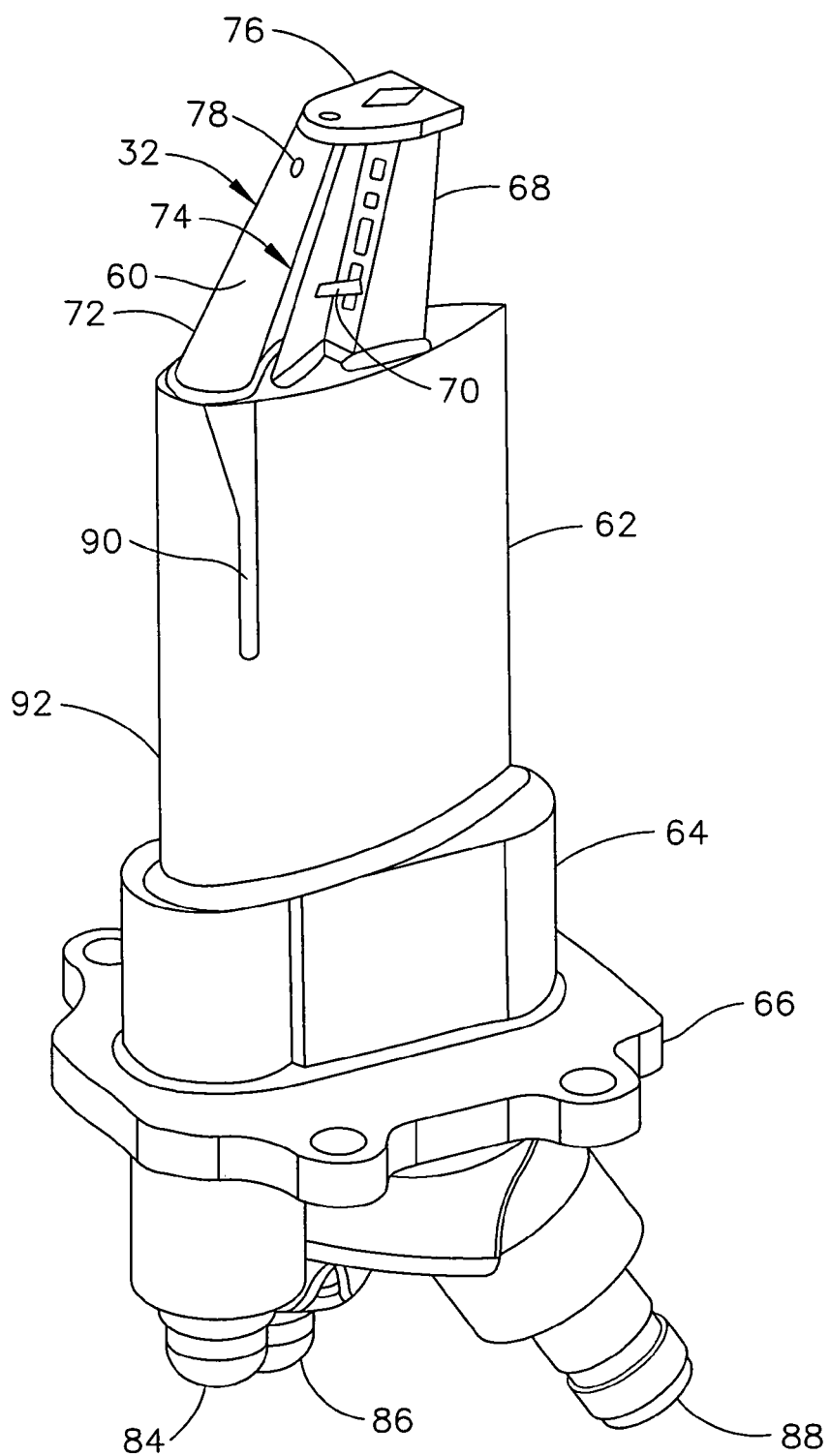
FIG. 2 is a schematic side elevation view of one embodiment of an isothermal temperature sensor.

FIG. 2 is a schematic side elevation view of probe 32 comprising a sensor shield 60 supported by pylon 62 supported by pedestal 64 and flange 66 supporting the probe 32. A three-sided shield 68 surrounds temperature sensor 70 and is open in the upstream side to expose the temperature sensor 70 to air flow. A shield 72 is disposed upstream of temperature sensor 70 to protect temperature sensor 70 from impingement of any particles entrained in air flow entering the compressor inlet 34. Shield 72 is connected to three-sided shield 68 is spaced from three-sided shield 68 by a gap 74 and secured by pressure line cap 76 to allow air contact with the temperature sensor 70. A pitot pressure inlet port 78 through shield 72 provides air flow to a pressure sensing element (not shown). The pylon 62 includes a pressure fitting 84 for connecting the pitot pressure inlet port 78 to a pressure sensing element (not shown) and to remote read-out devices (not shown), a total temperature readout fitting 86 and a static pressure fitting 88. Slots 90 through forward wall 92 of pylon 62 may be used to admit air flow to the interior of the pylon 62 into contact with a pressure sensing element (not shown).

Figure 3:
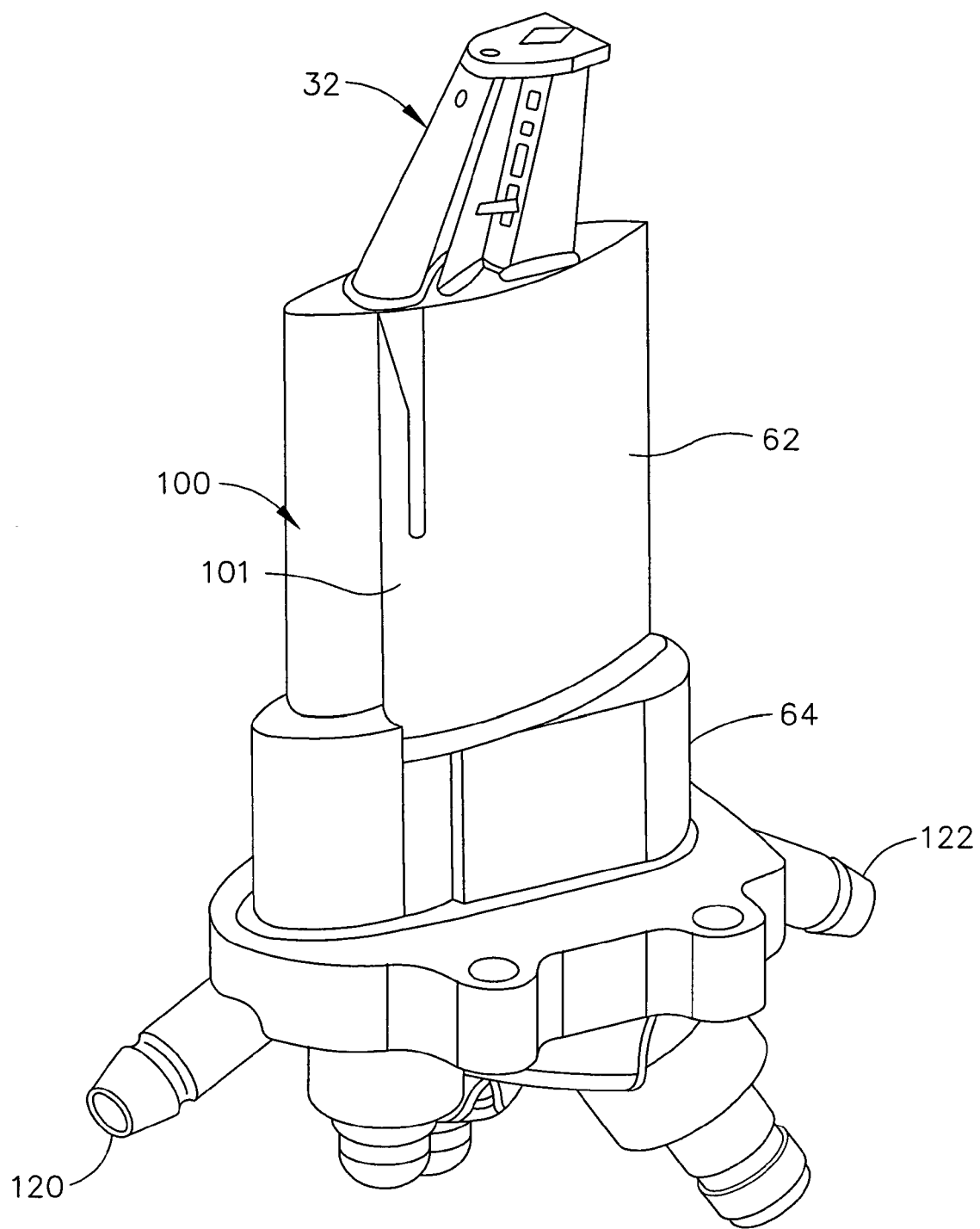
FIG. 3 is a schematic side elevation view of a probe incorporating a heat pipe.

FIG. 3 is a schematic elevation view of a compressor inlet isothermal temperature and pressure sensor mounted within a probe 32 and supported by a pylon 62 incorporating a heat pipe 100. A heat pipe 100 is disposed on the upstream end 101 of pylon 62 and pedestal 64 and is disposed in heat exchange relationship with said probe 32. A fluid inlet port 120 and outlet port 122 provide a flow path for heated air or other fluid to heat the heat pipe 100.

Figure 4:
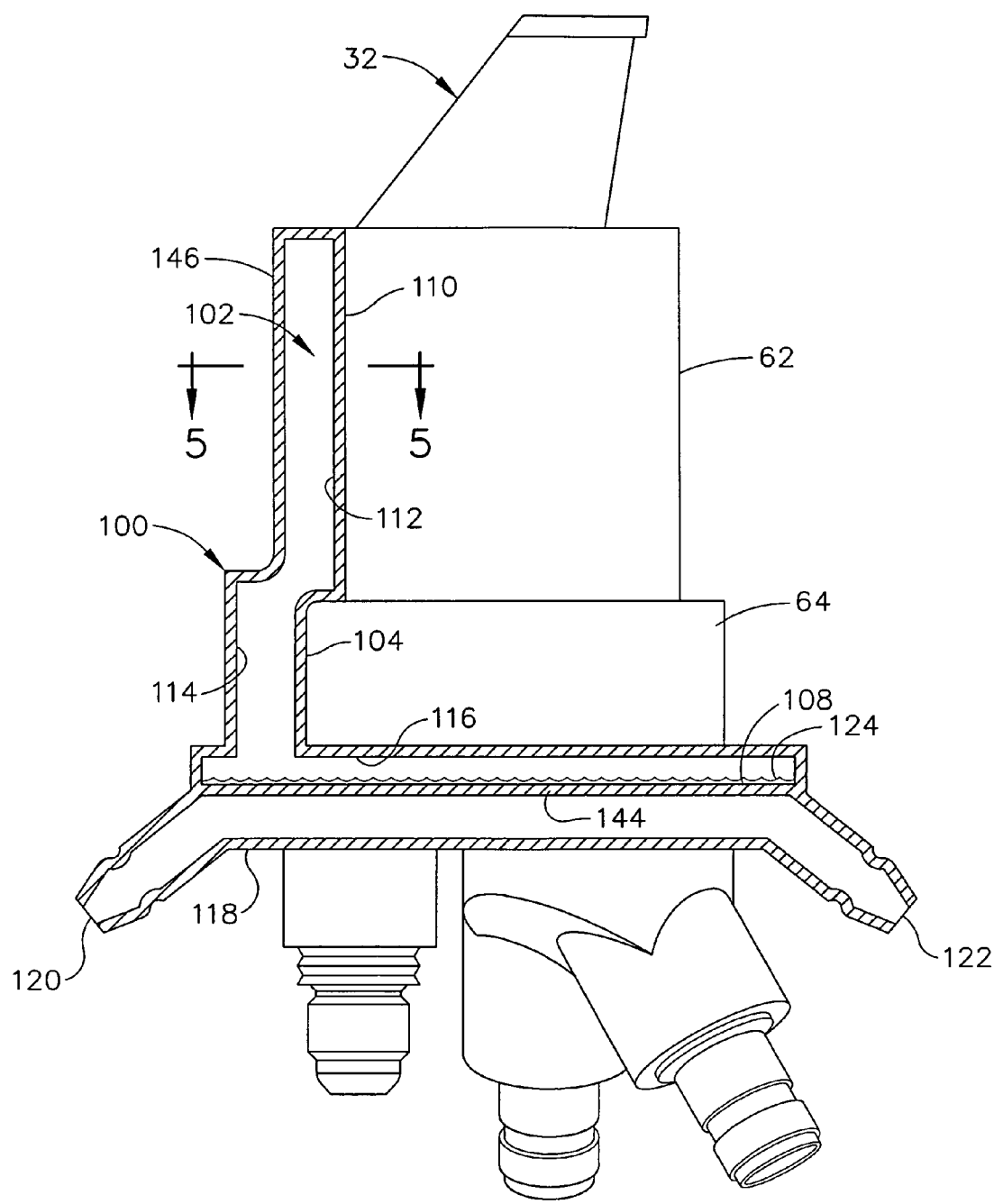
FIG. 4 is a schematic side elevation cross-sectional view of a probe incorporating a heat pipe.

FIG. 4 is a cross-sectional view of the pylon and heat pipe structure disposed upstream of the pylon. Heat pipe 100 comprises closed, pressurized volume 102 including wall section 110 disposed adjacent pylon 62, base wall 104 disposed adjacent pedestal 64 and heated wall surface 108. The interior surfaces 112, 114, and 116 of the closed, pressurized volume 102 are covered by wicking material. Heated wall surface 108 is the outer wall of a fluid supply tube 118 having inlet port 120 and outlet port 122. A vaporizable liquid 124 is disposed within the closed, pressurized volume 102. The vaporizable liquid 124 is selected based upon its latent heat of vaporization, surface tension and required heat transfer characteristics to maintain the sensor surface temperature above the freezing point to prevent ice accumulation.

Figure 5:
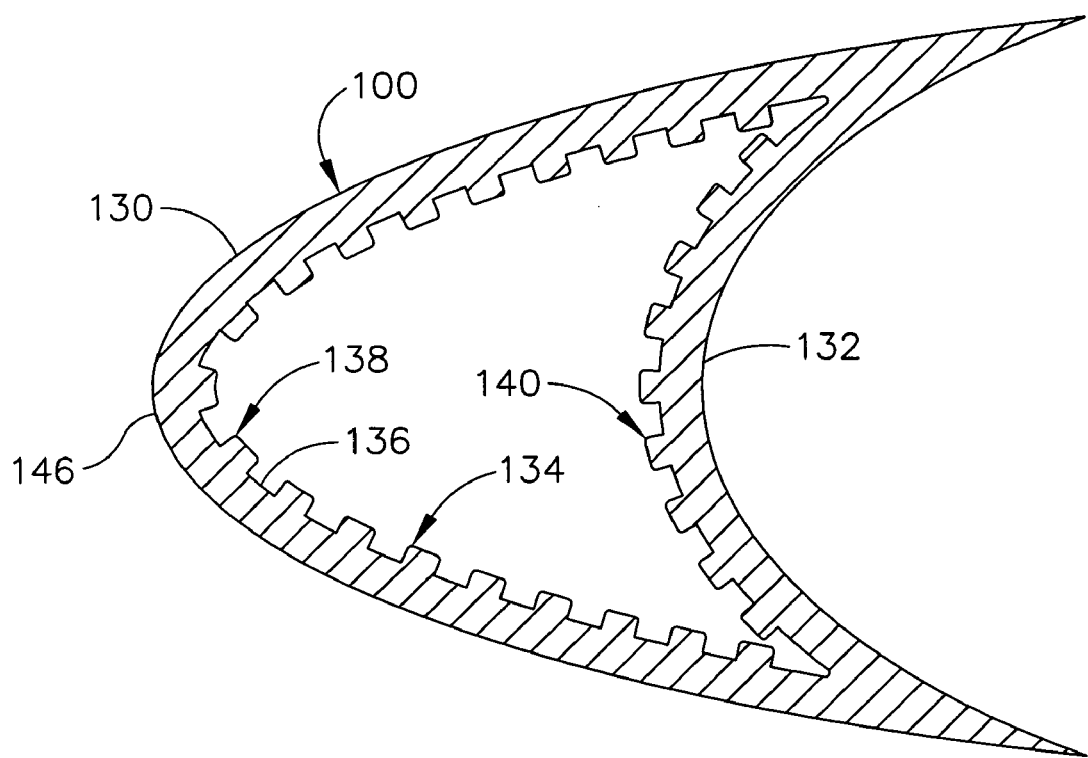
FIG. 5 is a schematic cross-sectional view of a heat pipe for an isothermal temperature and pressure sensor taken along line 5-5 of FIG. 4.

FIG. 5 is a cross-sectional view of the heat pipe 100 taken along line 5-5 of FIG. 4. The heat pipe 100 has an arcuate front wall 130 and an arcuate aft wall 132, each of which has wicking material 134 covering its interior surfaces. A plurality of grooves 136 extending along each surface 138 and 140 acts as a capillary surface to promote capillary motion of the vaporizable liquid within the heat pipe 100. The heat pipe may use other capillary materials, such as fabrics compatible with the vaporizable liquid and tolerant of the heat conditions and compatible with the vaporizable liquid used.

During operation of the gas turbine engine 10, heated air or other fluid is supplied to fluid supply tube 118 from a source such as a chosen stage of the compressor or from the compressor discharge. The heat of the fluid in fluid supply tube 118, FIG. 4, is transferred across the wall 144 of fluid supply tube 118 and heated wall surface 108 and absorbed in an evaporator region within the pedestal 64 to boil the vaporizable liquid 124. The boiling creates a vapor which fills the interior of the closed, pressurized volume 102 of heat pipe 100, which serves as a condenser region, where the vapor condenses and collects on the interior surfaces 112, 114 and 116, and is drawn by capillary action back to the evaporator region adjacent heated wall surface 108 to continue the vaporization/condensation cycle. This vaporization/condensation cycle maintains the temperature of the exterior surface 146 of the heat pipe 100 at an essentially constant temperature above freezing and thereby prevents ice accumulation. The sensing elements are maintained at a temperature which allows accurate readings to be taken.

While the invention has been described in terms of various specific embodiments, those skilled in the art will recognize that the invention can be practiced with modification within the spirit and scope of the claims.

What is claimed is:

1. An isothermal temperature and pressure sensor apparatus for a gas turbine engine comprising:
    a pylon;
    a probe supported by said pylon, said probe comprising a temperature sensor, a pressure sensor, and a shield surrounding said temperature sensor and said pressure sensor;
    a heat pipe disposed in heat exchange relationship with an upstream end of said pylon; and
    a fluid supply tube disposed in heat exchange relationship with said heat pipe.

2. The apparatus of claim 1 wherein said probe further comprises:
    a pressure inlet port though said shield in flow communication with said pressure sensor; and
    a gap in said shield surrounding said temperature sensor.

3. The apparatus of claim 2 wherein said heat pipe comprises:
    a closed, pressurized volume disposed adjacent said upstream end of said pylon;
    a wicking material disposed upon interior surfaces of said closed, pressurized volume; and
    a vaporizable liquid contained within said closed, pressurized volume.

4. The apparatus of claim 3 wherein said fluid supply tube includes one wall in heat exchange relationship with a heated wall section of said closed, pressurized volume.

5. An isothermal temperature and pressure sensor for a gas turbine compressor comprising:
    a pylon projecting from a stator component into a compressor inlet flow path and configured so that the axially forward surface of said pylon comprises an exterior surface of a heat pipe;
    a fluid supply tube disposed adjacent and in heat exchange relationship with one wall of said closed, pressurized volume and having a fluid inlet port and a fluid outlet port;
    a probe projecting radially from said pylon into said compressor inlet flow path;
    a temperature sensor disposed within said probe; and
    a pressure sensor disposed within said probe.

6. The apparatus of claim 5 wherein said heat pipe comprises:
    a closed, pressurized volume configured as a heat pipe containing a vaporizable liquid and comprising an evaporator region and a condenser region and a wicking material disposed on the interior surface of said closed volume.

7. The apparatus of claim 6 wherein said wall of said heat supply tube is disposed adjacent and in heat exchange relationship with one wall of said closed, pressurized volume at an evaporator region of said heat pipe.

8. A method for deicing a temperature and pressure sensor comprising:
    disposing a heat pipe in heat exchange relationship with a probe housing a temperature sensor and a pressure sensor, wherein the temperature and pressure sensors are surrounded by the same shield; and
    supplying heated fluid to a fluid supply tube in heat exchange relationship with said heat pipe.

* * * * *

UNITED STATES PATENT AND TRADEMARK OFFICE
CERTIFICATE OF CORRECTION

PATENT NO.       : 7,313,963 B2                                            Page 1 of 1
APPLICATION NO.  : 11/363772
DATED            : January 1, 2008
INVENTOR(S)      : Kuznar It is certified that error appears in the above-identified patent and that said Letters Patent is hereby corrected as shown below:

In Claim 2, column 4, line 5, delete "though" and insert therefor -- through --.

Signed and Sealed this

Seventeenth Day of June, 2008

JON W. DUDAS
*Director of the United States Patent and Trademark Office*